(12) United States Patent
Mackenzie

(10) Patent No.: US 10,368,294 B2
(45) Date of Patent: Jul. 30, 2019

(54) METHOD AND APPARATUS FOR DETERMINING A NETWORK SEARCH PARAMETER IN A MOBILE COMMUNICATIONS NETWORK

(71) Applicant: British Telecommunications Public Limited Company, London (GB)

(72) Inventor: Richard Mackenzie, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/116,380

(22) PCT Filed: Feb. 5, 2015

(86) PCT No.: PCT/GB2015/050311
§ 371 (c)(1),
(2) Date: Aug. 3, 2016

(87) PCT Pub. No.: WO2015/118327
PCT Pub. Date: Aug. 13, 2015

(65) Prior Publication Data
US 2017/0013542 A1    Jan. 12, 2017

(30) Foreign Application Priority Data
Feb. 6, 2014    (EP) ..................... 14250019

(51) Int. Cl.
H04W 4/00      (2018.01)
H04W 48/08     (2009.01)
H04W 76/19     (2018.01)
H04W 48/16     (2009.01)
H04W 16/32     (2009.01)

(52) U.S. Cl.
CPC .......... *H04W 48/08* (2013.01); *H04W 16/32* (2013.01); *H04W 48/16* (2013.01); *H04W 76/19* (2018.02)

(58) Field of Classification Search
None
See application file for complete search history.

(56) References Cited

U.S. PATENT DOCUMENTS

| 2010/0195621 | A1 | 8/2010 | Kekki et al. |
| 2011/0124334 | A1 | 5/2011 | Brisebois et al. |
| 2012/0015651 | A1 | 1/2012 | Damenti et al. |
| 2012/0122452 | A1 | 5/2012 | Brisebois |
| 2012/0236717 | A1 | 9/2012 | Saska et al. |
| 2012/0252451 | A1 | 10/2012 | Knauft et al. |
| 2012/0269163 | A1 | 10/2012 | Edara |

(Continued)

FOREIGN PATENT DOCUMENTS

| CN | 1780477 A | 5/2006 |
| CN | 101 299 870 A | 5/2008 |

(Continued)

OTHER PUBLICATIONS

International Search Report for PCT/GB2015/050311, dated Apr. 23, 2015, 8 pages.

(Continued)

*Primary Examiner* — Suhail Khan

(57) ABSTRACT

The present disclosure provides a method for more efficiently managing a mobile communications network by varying the frequency with which a mobile terminal searches for a home network.

7 Claims, 3 Drawing Sheets

(56) References Cited

U.S. PATENT DOCUMENTS

| | | |
|---|---|---|
| 2012/0315908 A1 | 12/2012 | Li |
| 2013/0044660 A1* | 2/2013 | Edara .................... H04W 48/16 370/311 |
| 2013/0109377 A1 | 5/2013 | Al-Khudairi et al. |
| 2013/0231118 A1 | 9/2013 | Whinnett et al. |
| 2013/0344902 A1 | 12/2013 | Cili et al. |
| 2014/0274063 A1 | 9/2014 | Singh |

FOREIGN PATENT DOCUMENTS

| | | |
|---|---|---|
| WO | WO2009/000298 A1 | 12/2008 |
| WO | WO 2009/146435 A1 | 12/2009 |
| WO | WO2012100144 A2 | 7/2012 |

OTHER PUBLICATIONS

Written Opinion of the International Searching Authority for PCT/GB2015/050311, dated Apr. 23, 2015, 10 pages.
International Search Report and Written Opinion for PCT/GB2015/050315, dated Apr. 24, 2015, 18 pages.
International Search Report and Written Opinion for PCT/GB2015/050313, dated Apr. 24, 2015, 18 pages.
International Search Report and Written Opinion for PCT/GB2015/050312, dated Apr. 22, 2015, 17 pages.
CN Office Action for CN Patent Application No. 201580013820.7, dated Feb. 2, 2019, 16 pages.

* cited by examiner

METHOD AND APPARATUS FOR
DETERMINING A NETWORK SEARCH
PARAMETER IN A MOBILE
COMMUNICATIONS NETWORK

RELATED APPLICATIONS

The present application is a National Phase entry of PCT Application No. PCT/GB2015/050311, filed on Feb. 5, 2015, which claims priority to EP Patent Application No. 14250019.8, filed on Feb. 6, 2014, which are hereby fully incorporated herein by reference.

TECHNICAL FIELD

The present disclosure relates to a method of operating a mobile communications network, and in particular to a method of operating a mobile communications network which comprises a plurality of femtocells alongside other mobile communications networks which comprise a plurality of macrocells.

BACKGROUND

FIG. 1 shows a schematic depiction of a mobile communications network 100 which comprises a first plurality of femtocells 110 and a second plurality of macrocells 120. One macrocell will cover a substantially larger area than a femtocell and thus it will be appreciated that the network 100 may comprise many more femtocells than macrocells. Operators of conventional mobile communications networks deploy femtocells in areas where there are high levels of network use, for example in city centers, shopping malls, transport interchanges. However, there is the possibility that a first organization is operating the plurality of femtocells and that a second organization is operating the plurality of macrocells. In such a scenario, customers of the first organization would have their calls and data sessions routed via a femtocell when they are within the coverage of a femtocell. When the customers were outside of the range of a femtocell then their calls and data sessions would be routed via a macrocell, with a roaming agreement being in place between the first and second organizations.

Thus, it can be seen that the first organization will be motivated for its customers to connect via a femtocell in preference to via a macrocell whenever possible. Firstly, it is likely that users connected via a femtocell will experience a better throughput of data (as typically there will be fewer users in a femtocell than in a macrocell and thus the bandwidth available within a femtocell is likely to be greater than that within a macrocell on a per user basis). Furthermore, there is a commercial driver for the first organization as it will be cheaper to route data via the femtocells as it will not have to pay roaming charges to the second organization for routing data via the macrocells.

U.S. 2012/0015651 discloses a method of determining a network search frequency in the situation where a user terminal moves from a location where there is network coverage to a second location which is outside of the service area provided by the network. U.S. 2011/0124334 discloses a method of cell re-selection when moving from one location to a second location within a defined network.

SUMMARY

According to a first aspect of the present disclosure there is provided a method of operating a mobile communications network, the method comprising: a) in response to a mobile terminal losing a first connection with a femtocell associated with a home mobile network and then making a second connection with a macrocell associated with a visited mobile network, determining a network search parameter value for the mobile terminal; b) transmitting the network search parameter value to the mobile terminal; c) periodically re-determining the value of the network search parameter if the mobile terminal is still connected with the macrocell associated with the visited mobile network; and d) transmitting the network search parameter value determined in c) to the mobile terminal.

The first connection with the femtocell associated with the home mobile network may be lost because the mobile terminal moves out of the area covered by the femtocell, or because the apparatus which provides the femtocell ceases to operate. Such an approach allows the mobile terminal to search for the home network in order to be able to switch back from the visited network to the home network as soon as is feasible.

The value of the network search parameter may increase as the time for which the mobile terminal is connected with the macrocell associated with the visited mobile network increases. The value of the network search parameter can be an integral multiple of 6 minutes. The network search parameter value may be stored by the mobile terminal.

According to a second aspect of the present disclosure there is provided an apparatus for use in a mobile communications network, the apparatus, in use, being configured to i) determine a network search parameter value for a mobile terminal, in response to the mobile terminal losing a first connection with a femtocell associated with a home mobile network and making a second connection with a macrocell associated with a visited mobile network; ii) transmit the network search parameter value to the mobile terminal; iii) periodically re-determine the value of the network search parameter if the mobile terminal is still connected with the macrocell associated with the visited mobile the network; and iv) transmit the network search parameter value determined in iii) to the mobile terminal.

According to a third aspect of the present disclosure there is provided a tangible data carrier for use in a computing device, the data carrier comprising computer executable code which, in use, performs a method as described above.

BRIEF DESCRIPTION OF THE DRAWINGS

Embodiments of the present disclosure will now be described, by way of example only, with reference to the accompanying drawings in which.

DETAILED DESCRIPTION

Figure 1:
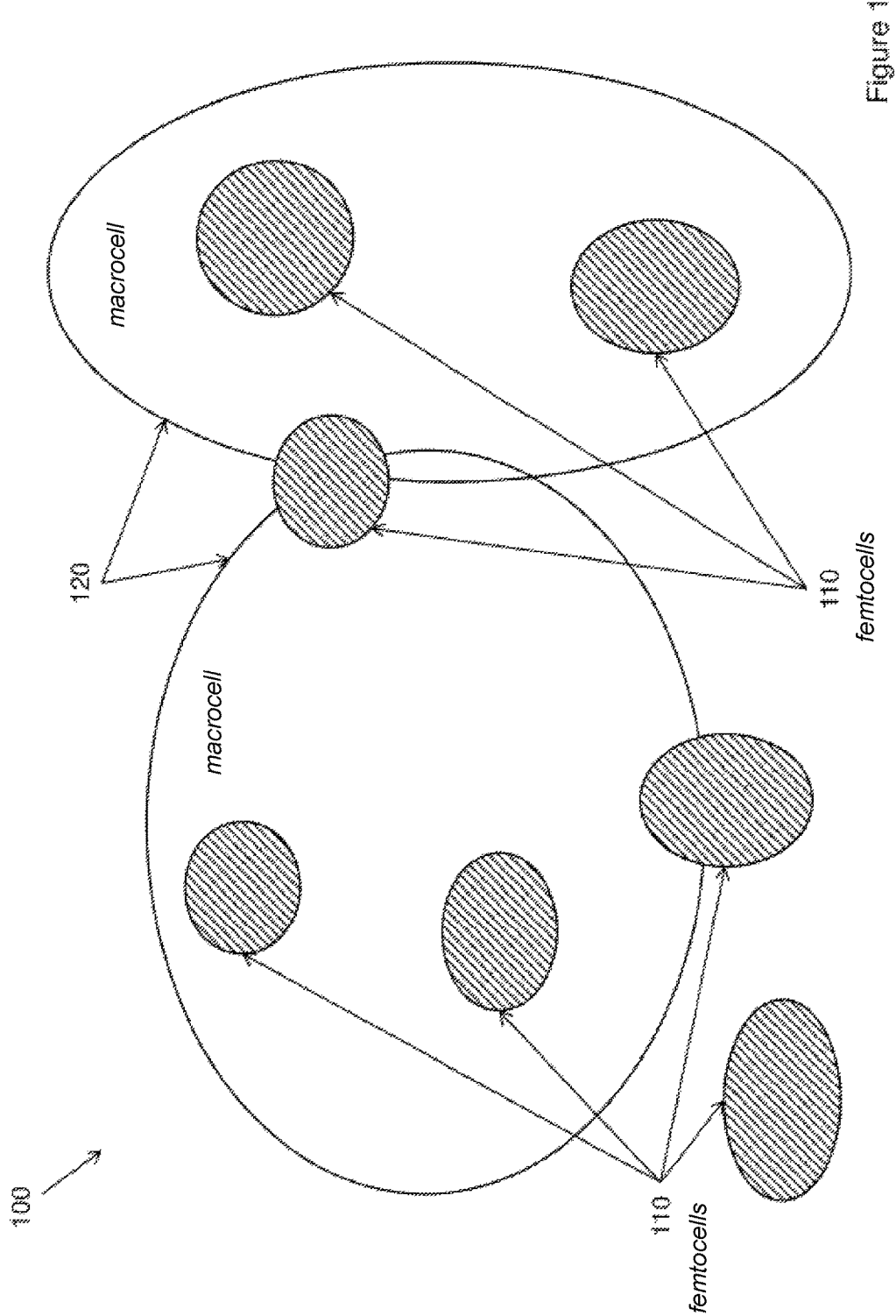
FIG. 1 shows a schematic depiction of a mobile communications network according to the present disclosure which comprises a first plurality of femtocells and a second plurality of macrocells.

Mobile networks, for example as described above with reference to FIG. 1, are often referred to as Public Land Mobile Networks (PLMNs). A mobile terminal will have a Home PLMN (HPLMN) which the terminal will connect to in preference to all other PLMNs. When the mobile terminal is outside of the coverage of the HPLM then it will connect to another network, known as a visited PLMN (VPLMN), in a process referred to as roaming. The VPLMN may be selected randomly from the PLMNs which are available to the mobile terminal, or there may be one or more higher priority PLMNs which will be selected by the mobile terminal in preference to other PLMNs.

When a mobile terminal is connected to a VPLMN it will occasionally search for its home PLMN, or one of the HPLMN's preferred PLMNs (PPLMN). This search is known as a higher priority PLMN search. Each mobile terminal will have a fixed parameter, T, which is normally programmed into its SIM card. The parameter T is a multiple of 6 minutes and the default value, which is typically used in practice, is 60 minutes. The mobile terminal will perform the search for its home PLMN at the frequency determined by the value of T. The default value of 60 minutes is typically used as it can minimize 'ping-pong' effects, that is a terminal making repeated transfers between a first and a second network, and also prevents excessive battery consumption caused by searching for a higher priority PLMN.

The network that a mobile terminal is connected to can over-ride the value of the parameter T if it is determined that searches are being made too frequently. In such a case, the network can issue a MinimumPeriodicSearchTimer value to the mobile terminal. If the MinimumPeriodicSearchTimer value is greater than the value of the T parameter then the MinimumPeriodicSearchTimer value will be used to determine the frequency of searches for the home PLMN.

In the following discussion, a number of examples will be provided to show how the MinimumPeriodicSearchTimer can be adjusted. As embodiments allow the network operator to determine the frequency of PLMN searches, the T parameter in the mobile terminal SIM should be set to its minimum value. The current standards have a minimum value of 6 minutes but it will be understood that this minimum value could be reduced further. In the absence of such limitations it will be understood that the T parameter value could be ignored and the frequency of PLMN searches be determined entirely based on the MinimumPeriodicSearchTimer parameter communicated from the network operator to a mobile terminal.

Table 1 below shows how the value of the MinimumPeriodicSearchTimer parameter can be varied with time. As can be seen from Table 1, searches can be made on a more frequent basis shortly after a mobile terminal has connected to a VPLMN. As the time that the mobile terminal has been connected to the VPLMN increases then the time between successive PLMN searches will increase. This is based on the fact that the failure of the more frequent PLMN searches to find the HPLMN (or a PPLMN) is indicative that the mobile terminal is not near to the HPLMN so the PLMN search frequency may be reduced. It will be understood that the time and MinimumPeriodicSearchTimer parameter values shown below in Table 1 are merely exemplary and that other values may be used as long as the MinimumPeriodicSearchTimer parameter values increase with time.

TABLE 1

Variation of MinimumPeriodicSearchTimer parameter with time.

| Time (minutes) from entering VPLMN | Issue new MinimumPeriodicSearchTimer value of |
| --- | --- |
| 0 | 2 |
| 12 | 6 |
| 36 | 12 |
| 120 | 60 |

Compared to a conventional mobile communications network using a fixed value for the PLMN search frequency, this embodiment of the present disclosure offers significant benefits. Overall battery usage is reduced (if the final value is larger than the fixed period that would have otherwise been used) when not in coverage of a preferred PLMN, yet the likely time to discover a preferred PLMN is quicker on average. In this embodiment the network operator will determine appropriate parameter values in order to balance the compromise between fast searches vs the unwanted 'ping-pong' effect and the reduction in battery life, based on testing.

Other methods of determining the MinimumPeriodicSearchTimer parameter value will now be described. The increasing of MinimumPeriodicSearchTimer with time can be implemented without any reference to the state or condition of the mobile terminals. The following methods rely, to some extent, on monitoring one or more parameters from one or more mobile terminals. It will be understood that the method by which these parameters are reported by the mobile terminals is not of relevance to the present disclosure. Further data and or parameters which may be used to determine the value of MinimumPeriodicSearchTimer may be generated or collected within the network.

TABLE 2

Variation of MinimumPeriodicSearchTimer value with time and number of previous switches

| Time (minutes) from entering VPLMN | Issue new MinimumPeriodicSearchTimer value of | | |
| --- | --- | --- | --- |
| | If 2 or more PLMN switch in X minutes | If 1 PLMN switch in X minutes | If no PLMN switch in X minutes |
| 0 | 12 | 6 | 2 |
| 12 | 12 | 12 | 6 |
| 36 | 12 | 12 | 12 |
| 120 | 60 | 60 | 60 |

Table 2 shows an example of how the value of MinimumPeriodicSearchTimer may vary in accordance with the time for which a mobile terminal has been connected to a VPLMN and also the number of PLMN switches that have been made in a predetermined time period. The predetermined time period may have a value between 1 and 30 minutes, although larger values may be used.

It can be seen that mobile terminals which have made a greater number of recent network switches will search less frequently than mobile terminals which have made fewer (or no) recent network switches. By determining the MinimumPeriodicSearchTimer in the manner described with reference to Table 2, the unwanted effects of too many frequent network switches (e.g. excessive battery usage and potential drop on quality of experience (QoE)) can be reduced whilst still giving users a greater opportunity to switch from a VPLMN to the HPLMN where it is available.

Mobility history for a mobile terminal in idle mode is not standardized so the data on the timing and number of previous switches could come from a network management system, in either the home or visited network, or from the mobile terminal itself.

TABLE 3

Variation of MinimumPeriodicSearchTimer value with location of mobile terminal
Issue new MinimumPeriodicSearchTimer value of

| Where no HPLMN/PPLMN expected | Where HPLMN/PPLMN edge expected | Within expected coverage of HPLMN/PPLMN |
|---|---|---|
| 255 | 30 | 2 |

Table 3 shows an exemplary set of MinimumPeriodicSearchTimer values which vary in accordance with the location of the mobile terminal. Such a method is of use as the location of the femtocells and macrocells are known and is unlikely to vary. If a mobile terminal is within expected coverage of the HPLMN (or a PPLMN) then it will be preferred that the mobile terminal switch from a VPLMN to the HPLMN quickly. Similarly, if it can be determined that the mobile terminal is outside the coverage of the HPLMN then HPLMN searches should be carried out infrequently to reduce battery drainage. It will be understood that the location of the mobile network may be determined by the network, for example using well known triangulation methods, or by the mobile terminal reporting its own location, for example based on GPS circuitry within the terminal. Mobile terminals are likely, by definition, to vary their location and thus the terminal location should be determined on a periodic basis, for example every 30 minutes, and the MinimumPeriodicSearchTimer determined accordingly.

Table 4 shows an exemplary set of MinimumPeriodicSearchTimer values for a further method in which the values are determined in accordance with both the location of the mobile terminal and the time since it connected to the VPLMN. Such a hybrid approach prevents the unwanted effects of regular PLMN searching (i.e. excessive battery usage) in the event that it is not possible to switch to the HPLMN despite the location of the mobile terminal indicating that such a switch is feasible.

TABLE 4

Variation of MinimumPeriodicSearchTimer value with time and location of mobile terminal

| Time (minutes) from entering VPLMN | Issue new MinimumPeriodicSearchTimer value of | | |
|---|---|---|---|
| | Where no HPLMN/PPLMN expected | Where HPLMN/PPLMN edge expected | Within expected coverage of HPLMN/PPLMN |
| 0 | 60 | 6 | 2 |
| 12 | 60 | 12 | 6 |
| 36 | 60 | 12 | 12 |
| 120 | 255 | 60 | 60 |

Table 5 shows a further example of how MinimumPeriodicSearchTimer values can be determined, in this case in accordance with a condition of the mobile terminal, for example the remaining battery charge. The battery condition may be reported periodically by the mobile terminal, or the network may poll the terminal periodically to obtain the data. Thus, the search frequency may be adjusted in order to maintain battery life by making searches less frequent as battery life decreases.

TABLE 5

Variation of MinimumPeriodicSearchTimer value with battery condition

| Battery lifetime at most recent update | Issue new MinimumPeriodicSearchTimer value of |
|---|---|
| >50% | 2 |
| 50% > 25% | 6 |
| 25% > 15% | 60 |
| 15%> | 255 |

The way battery life is reported is likely to be vendor specific. Battery life may then be reported by methods such as a percentage of expected battery life remaining, as descriptors such as low/medium/high, or as a number of mW hours remaining. The operator may also use knowledge of the power consumption behaviors of various handsets and/or users when deciding on the appropriate action.

The method described above with respect to Table 5 may also be used in conjunction with the other methods described above so that the MinimumPeriodicSearchTimer value indicated by the battery level may act as a threshold so that other methods may be used to determine the MinimumPeriodicSearchTimer but that value would be only be used if it indicated a MinimumPeriodicSearchTimer value greater than that indicated by Table 5 (that is, searches would only be performed at a lower frequency than that indicated by Table 5).

Table 6 shows a yet further set of MinimumPeriodicSearchTimer values, which are determined in accordance with one or more user preferences.

TABLE 6

Variation of MinimumPeriodicSearchTimer with user preference

| | Issue new MinimumPeriodicSearchTimer value of | | | |
|---|---|---|---|---|
| Battery lifetime at most recent update | Where user wants to maximize battery life at all costs | Where user wants to minimize roaming charges at all costs | User concerned about battery more than roaming | User concerned about roaming more than battery |
| >50% | 255 | 2 | 6 | 2 |
| 50% > 25% | 255 | 2 | 12 | 6 |
| 25% > 15% | 255 | 2 | 60 | 12 |
| 15%> | 255 | 2 | 255 | 60 |

Table 6 shows an example where the user is given the option from selecting from 4 profiles which indicate their preferences, for example in prioritizing battery life over the cost of roaming (which may be incurred by using a VPLMN and is likely to be passed on to the user by a network operator) and vice versa. The MinimumPeriodicSearchTimer values are then determined in accordance with the selected profiles, as can be seen from Table 6.

It will be understood that other schemes for determining MinimumPeriodicSearchTimer values in accordance with user preferences may be devised. For example, a user may be able to send real time QoE data to the network (for example, the user's mobile terminal may run a QoE reporting application), and possibly also the reasons for a given QoE, for example the fact that the battery is running low, or that the battery is draining quickly. The data from such reports may then be used to determine a MinimumPeriodicSearchTimer value.

A simple example could be to set:

Minimum possible value for MinimumPeriodicSearchTimer=2 mins

Maximum possible value for MinimumPeriodicSearchTimer=240 mins

Start MinimumPeriodicSearchTimer value=6 minutes when User reports decrease in QoE due to battery issues, double the MinimumPeriodicSearchTimer value when User reports QoE drop due to high amount of roaming charges, halve the MinimumPeriodicSearchTimer value with the MinimumPeriodicSearchTimer value being kept within the bounds set by the maximum and minimum values.

It will be understood that such a preference-based approach could also incorporate some of the mechanisms described above, i.e. setting a threshold value based on battery level, varying the MinimumPeriodicSearchTimer value in accordance with the terminal location or time connected to the VPLMN, etc.

Table 7 shows a still further example of how the MinimumPeriodicSearchTimer value can be varied in the event of a failure of the HPLMN. If one or more of the femtocells which are part of the HPLMN were to fail for a short period of time then this failure can be signaled to the operator of the VPLMN (or VPLMNs) to which the mobile terminals will connect (the operators of the VPLMN(s) may be able to infer the failure of the HPLMN based on the sudden number of roaming connections being made in one or more concentrated locations).

TABLE 7

Variation of MinimumPeriodicSearchTimer with network availability

| Probability that HPLMN now available in area | Issue new MinimumPeriodicSearchTimer value of |
|---|---|
| >95% | 2 |
| 95% > 50% | 6 |
| 50% > 5% | 20 |
| 5%> | 255 |

If the mobile terminal were to determine the MinimumPeriodicSearchTimer value in accordance with some of the methods discussed above then there may be many frequent searches made even though there may be no HPLMN to switch to. Thus, if the MinimumPeriodicSearchTimer values are determined as set out in Table 7 then when there is a very low likelihood of the HPLMN being available (i.e. very shortly after failure) then there is a very high MinimumPeriodicSearchTimer value, which will reduce as the likelihood of the HPLMN being available increases. The likelihood of the HPLMN being available may be inferred based on the time since the failure. When the service is restored then this information can be sent to the VPLMN so that a very low MinimumPeriodicSearchTimer value is transmitted to the mobile terminals so that the mobile terminals can swiftly re-connect to the HPLMN.

Table 8 shows a variant of the method discussed above with respect to Table 7, in which the determination of the MinimumPeriodicSearchTimer value is also made with respect to the number of mobile devices which are looking to switch back to the HPLMN. Such control of the search frequency can prevent too much signaling from occurring in a short space of time.

TABLE 8

Variation of MinimumPeriodicSearchTimer with network availability and number of terminals requiring to switch to the HPLMN.

| | Issue new MinimumPeriodicSearchTimer value of | | | |
|---|---|---|---|---|
| Probability that HPLMN now available in area | Number of devices looking for HPLMN >50 | Number of devices looking for HPLMN 50 < 20 | Number of devices looking for HPLMN 20 < 10 | Number of devices looking for HPLMN <10 |
| >95% | 60 | 6 | 6 | 2 |
| 95% > 50% | 60 | 20 | 12 | 6 |
| 50% > 5% | 120 | 60 | 60 | 20 |
| 5%> | 255 | 255 | 255 | 60 |

In the examples described above, the network would have to go into connected mode in order to be able to receive parameter values, or other similar data from one or more mobile terminals. This connection may be initiated either by network or by the mobile terminal. Data could be transferred to the network either during the next scheduled connection or a connection may be initiated for the purpose of transferring parameters. The signaling overhead required to make such a connection may be a factor which is taken into account when determining the frequency of updates. It will be understood that parameters could also be generated from within the network, either a VPLMN or a HPLMN. These parameters may then be reported to a base station which is in communication with the mobile terminal.

The determination of a MinimumPeriodicSearchTimer value may be made in a distributed manner, that is the values are calculated for each mobile terminal by the respective base station. Alternatively, centralized calculations may be made, with the parameter values being issued to all the respective mobile terminals, for example from the Mobility Management Entity (MME). The parameters may be transmitted to the mobile terminals using a non-access stratum (NAS) message, which allows the parameter to be sent to one or more terminals as required.

In some of the methods discussed above, the determination of a value of MinimumPeriodicSearchTimer is based on monitoring one or more parameters. These parameters would typically come from the mobile terminal. It will be understood that the specific manner in which these parameters are reported is not relevant to the operation of the present invention. For example an application could run on the phone, which sends periodic or threshold based updates, to an application server. The application server would then send the relevant information to the base station (or eNodeB in the context of LTE networks). An alternative could be to upgrade the specification of logged minimization of drive testing (MDT) reporting. After each update a network may decide to take action to update MinimumPeriodicSearchTimer.

The granularity of HPLMN searching in 3GPP can only go down to multiples of 6 minutes at the moment. Embodiments of the present disclosure make it possible to determine MinimumPeriodicSearchTimer values with smaller granularities which could be fed into 3GPP standardisation. It will be understood that embodiments of the present disclosure could be used within the context of the present standards with a value of MinimumPeriodicSearchTimer being determined in a manner as described and then being rounded to the nearest multiple of 6 minutes.

Figure 2:
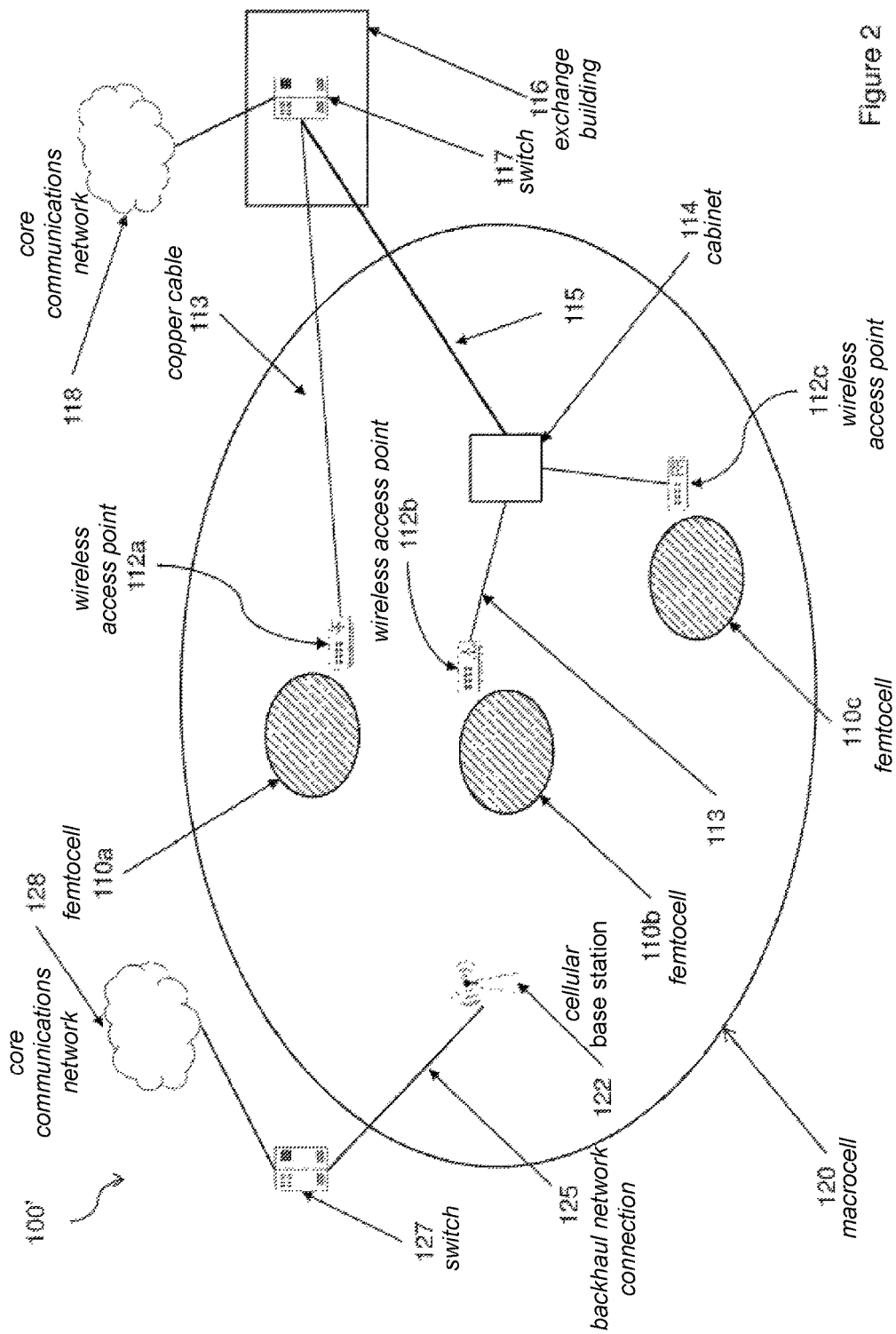
FIG. 2 shows a schematic depiction of a further embodiment of a communications network according to the present disclosure.

FIG. 2 shows a schematic depiction of a further embodiment of a communications network 100' according to the present invention. Network 100' comprises a plurality of femtocells 110*a*, 110*b*, 110*c* and a single macrocell 120. All of the plurality of femtocells are contained within the area covered by the macrocell 120. The macrocell is provided using a conventional cellular base station 122, which has a backhaul network connection 125 to a switch 127 which allows data and/or voice signals to be routed to and from the base station, and thence to cellular terminals which are connected to the cellular base station. The switch 127 is further connected to a core communications network 128. The macrocell provides an LTE interface but may also provide further radio interfaces such as GSM, 3G etc.

Each of the femtocells 110*a*, 110*b*, 110*c* are provided by a respective wireless access point 112*a*, 112*b*, 112*c*. The wireless access points each have a respective connection to an exchange building 116, which houses a switch 117 which allows data to be sent to and from the wireless access points. The switch 117 is further connected to a core communications network 118. Wireless access point 112*a* is connected to the exchange using a copper cable 113 with the data being transported using, for example, ADSL technology which can provide up to 24 Mbit/s. Wireless access points 112*b* & 112*c* both have copper cable connections 113 to a cabinet 114 which houses VDSL equipment. The cabinet 114 is then connected to the exchange using an optical fiber connection 115. VDSL technology can be used to transport data at rates of up to 80 Mbit/s.

The wireless access points may preferably comprise a conventional internet router and WiFi access point which further comprises an appropriate radio interface, such as LTE, to allow it to function as a wireless access point for a cellular network. It will be understood that other network technologies may be used to connect the wireless access points to the exchange (for example, fiber to the premises (FTTP), point to point radio, etc) and that this is not relevant to the operation of embodiments of the present disclosure.

When a mobile terminal is turned on within the coverage of one of the femtocells 110 then it will connect to the femtocell as the plurality of femtocells form a part of the HPLMN. When the HPLMN is lost to the mobile terminal (see below) then the mobile terminal will connect to the macrocell 120, which forms part of a VPLMN. As discussed previously, it is preferred that as much traffic be carried over the HPLMN as possible, in order to maintain network capacity on the VPLMN and to reduce any cost which may be incurred by sending traffic over the VPLMN. Thus, the mobile terminal will seek to transfer back to the HPLMN as soon as feasible, with the PLMN search frequency being selected and/or varied in accordance with one of the methods described above.

It will be understood that even if there are a large number of femtocells within the area covered by a single macrocell then there will be significant areas of the macrocell which are not covered by a femtocell. Thus, if a mobile terminal is moving then it is likely that it will move out of femtocell coverage and will need to handover to the macrocell.

Furthermore, it is likely that the availability of a given femtocell will be less than that of the macrocell base station. The wireless access points are likely to be provided in domestic and commercial properties in the same manner that WiFi hotspots are currently provided. Thus, they may be disconnected or powered off if the property is not occupied; if the ADSL/VDSL connection were to fail then the wireless access point would not be able to operate properly; the loss of electrical power to the property would cause the wireless access point to fail (whereas base stations are normally provided with battery backup power systems); the wireless access point may be power cycled in attempt to clear a fault, etc. Regardless of the cause of the failure of the wireless access point, the mobile terminal will need to handover to the macrocell and then seek to move back to a femtocell as soon as is feasible.

Such a mobile terminal may comprise a smart phone, tablet, or other mobile computing device (see below). An app may be provided to control the operation of the mobile terminal such that an appropriate PLMN search frequency can be selected and then varied as needed. This app may contain data regarding the likely location of femtocells, for example based on the address of customers who have suitably equipped wireless access points in their premises. The mobile terminal can determine its location, using known techniques, and then calculate the likelihood that a wireless access point is in range. Depending on the result of this calculation then the PLMN search frequency may be varied accordingly.

As the wireless access point is likely to also provide WiFi connectivity, if the app detects that the mobile terminal has re-established a WiFi connection subsequent to the connection being lost then this can be used to infer that there is a high probability that the terminal is within the coverage of a femtocell. This inference can be strengthened by identifying the provider of the WiFi service that the mobile terminal is connected to. This can be achieved by checking the SSID of the WiFi access point (for example 'BT WiFi') or by matching the IP address assigned to the WiFi interface with a predetermined range of IP addresses used by the network operator. This inference can be used to change the PLMN search frequency or can be a prompt which initiates a handover from the VPLMN to the HPLMN.

Figure 3:
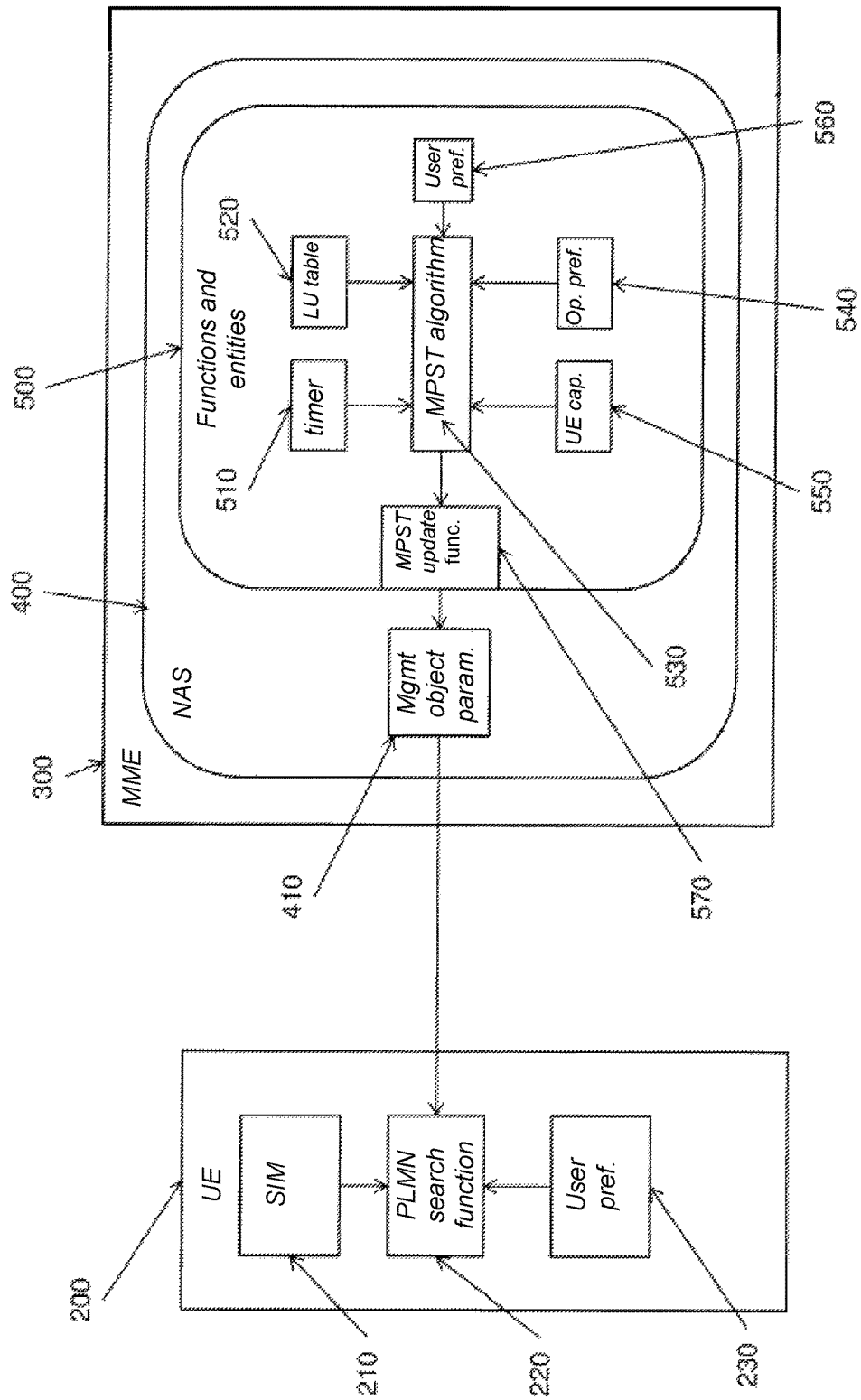
FIG. 3 shows a schematic depiction of a user equipment (UE) and the Mobility Management Entity (MME) when an embodiment is used in the context of LTE.

FIG. 3 shows a schematic depiction of a user equipment (UE) 200 and the Mobility Management Entity (MME) 300 when an embodiment of the present disclosure is used in the context of LTE. As will be understood by those who are skilled in the relevant technical field, the communications between the UE and the MME will be routed via the eNodeB which is omitted from FIG. 3 for the sake of clarity.

The UE 200 comprises a SIM 210, PLMN search function 220 and user preferences 230. The MME 300 controls a number of different UE control functions and uses the NAS (non-access stratum) 400. The NAS is a functional layer in the LTE protocol stacks which is used to carry dialogue between the UE and the network nodes. The NAS will store a plurality of management object parameters 410 for transmission to the UEs. The various functions and entities 500 required to implement an embodiment of the present disclosure comprise a UE timer 510, look-up table 520, a MinimumPeriodicSearchTimer algorithm 530, operator preferences 540, UE capabilities 550, user preferences 560 and a MinimumPeriodicSearchTimer update function 570.

The UE SIM 210 stores a value for T, which can determine the frequency of PLMN searches if it is less than the MinimumPeriodicSearchTimer parameter value. It will be understood that this is a feature of the present standards and that these standards could be modified so that the MinimumPeriodicSearchTimer parameter value provided by the network operator takes priority over the T parameter value stored in the SIM. The SIM also stores data regarding the HPLMN and one or more PPLMNs. The PLMN search function carries out the search for a PLMN and is activated in accordance with the MinimumPeriodicSearchTimer parameter value determined as described above. User preferences 230 store a number of data parameters and measurements which can be reported to the network periodically, as described above. These parameters may include, for example, battery condition, UE location, QoE, QoE preferences, etc. and historical values and trends for one or more of these parameters and values.

As described above, the MinimumPeriodicSearchTimer algorithm 530 will determine a value for the MinimumPeriodicSearchTimer parameter based on the inputs received from one or more of the UE timer 510, operator preferences 540, UE capabilities 550, and the user preferences 560. The algorithm may be prompted to retrieve a MinimumPeriodicSearchTimer value from the look-up table 520 dependent on the outcome of the determination. It will be understood that the UE timer, UE capabilities and the user preferences will need to be stored and/or determined on a per user basis. The operator preferences may be stored and/or determined on a per user basis or for a group of one or more UEs. When a new MinimumPeriodicSearchTimer parameter value is determined for a particular UE then the value will be sent to the MinimumPeriodicSearchTimer update function 570, which will cause the new parameter value to be sent to the UE, as a management object parameter.

It will be understood that the various functions and entities 500 required to perform embodiments of the present disclosure can be implemented within a MME using appropriate software. Similarly, a conventional mobile terminal (which may be a mobile telephone, smartphone, or other mobile device) may be upgraded to be able to perform embodiments of the present disclosure by the installation of one or more apps or other software. Suitable computer code may be deployed to such devices via download, for example via the internet, or on some physical media, for example, DVD, CD-ROM, USB memory stick, etc. for which the device has an appropriate media reader.

In summary, embodiments of the present disclosure provide a method for more efficiently managing a mobile communications network by varying the frequency with which a mobile terminal searches for a home network.

The invention claimed is:

1. A method of operating a mobile communications network, the method comprising:
   a) in response to a mobile terminal losing a first connection with a first femtocell associated with a home mobile network and then making a second connection with a macrocell associated with a visited mobile network, wherein the macrocell contains the home mobile network femtocell to which the terminal was previously connected and one or more further home mobile network femtocells, determining a network search parameter value for the mobile terminal, the network search parameter value being used to determine when the mobile terminal searches for a home mobile network femtocell;
   b) transmitting the network search parameter value to the mobile terminal;
   c) periodically re-determining the network search parameter value if the mobile terminal is still connected with the macrocell associated with the visited mobile network; and
   d) transmitting the network search parameter value determined in c) to the mobile terminal,
   wherein an area covered by the macrocell comprises the first femtocell and at least one additional femtocell.

2. The method according to claim 1, wherein the network search parameter value increases as a time for which the mobile terminal is connected with the macrocell associated with the visited mobile network increases.

3. The method according to claim 1, wherein the network search parameter value is an integral multiple of 6 minutes.

4. The method according to claim 1, wherein the network search parameter value is stored by the mobile terminal.

5. An apparatus for use in a mobile communications network, the apparatus, in use, being configured to:
   i) determine a network search parameter value for a mobile terminal, the network search parameter value being used to determine when the mobile terminal searches for a home mobile network femtocell, in response to the mobile terminal losing a first connection with a first femtocell associated with a home mobile network and making a second connection with a macrocell associated with a visited mobile network wherein the macrocell contains the home mobile network femtocell to which the terminal was previously connected and one or more further home mobile network femtocells;
   ii) transmit the network search parameter value to the mobile terminal;
   iii) periodically re-determine the network search parameter value if the mobile terminal is still connected with the macrocell associated with the visited mobile the network; and
   iv) transmit the network search parameter value determined in iii) to the mobile terminal,
   wherein an area covered by the macrocell comprises the first femtocell and at least one additional femtocell.

6. The apparatus according to claim 5, the apparatus being, in use, further configured to increase the network search parameter value in accordance with a time for which the mobile terminal is connected to the mobile communications network.

7. A non-transitory computer-readable storage medium for use in a computing device and comprising computer executable code which, in use, performs the method according to claim 1.

* * * * *